(12) United States Patent
Murata

(10) Patent No.: US 9,022,187 B2
(45) Date of Patent: May 5, 2015

(54) DAMPING VALVE FOR SHOCK ABSORBER

(75) Inventor: Takao Murata, Minokamo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 109 days.

(21) Appl. No.: 13/808,714

(22) PCT Filed: Jun. 29, 2011

(86) PCT No.: PCT/JP2011/064904
§ 371 (c)(1),
(2), (4) Date: Jan. 7, 2013

(87) PCT Pub. No.: WO2012/014618
PCT Pub. Date: Feb. 2, 2012

(65) Prior Publication Data
US 2013/0105261 A1 May 2, 2013

(30) Foreign Application Priority Data

Jul. 28, 2010 (JP) ................................. 2010-168784
Jul. 28, 2010 (JP) ................................. 2010-168785

(51) Int. Cl.
*F16F 9/348* (2006.01)
*F16F 6/00* (2006.01)

(52) U.S. Cl.
CPC ................. *F16F 9/3484* (2013.01); *F16F 6/00* (2013.01); *F16F 9/3485* (2013.01)

(58) Field of Classification Search
CPC ............ F16F 6/00; F16F 15/03; F16F 6/005; F16F 9/3485; F16F 9/3484

USPC ....................................................... 188/267.2
See application file for complete search history.

(56) References Cited

U.S. PATENT DOCUMENTS

| | | | |
|---|---|---|---|
| 7,011,191 B2 * | 3/2006 | Spicer et al. .................. | 188/267 |
| 2007/0034464 A1 * | 2/2007 | Barefoot .................. | 188/322.15 |
| 2008/0277217 A1 | 11/2008 | Nakajima et al. | |

FOREIGN PATENT DOCUMENTS

| | | |
|---|---|---|
| JP | 09-291961 A | 11/1997 |
| JP | 2006-132554 A | 5/2006 |
| JP | 2007-263325 A | 10/2007 |
| JP | 2008-275126 A | 11/2008 |

* cited by examiner

*Primary Examiner* — Xuan Lan Nguyen
(74) *Attorney, Agent, or Firm* — Rabin & Berdo, P.C.

(57) ABSTRACT

The damping valve for a shock absorber includes a valve disc that delimits a cylinder interior filled with a working fluid, a port connects fluid chambers delimited by the valve disc, an leaf valve that is laminated onto the valve disc and is capable of moving in an axial direction of the valve disc so as to open and close the port in accordance with a differential pressure between the fluid chambers, and a biasing mechanism that biases the leaf valve in a direction for closing the port, wherein the biasing mechanism includes a shaft member constituted by a non-magnetic body, the leaf valve being disposed to be free to slide on an outer periphery of the shaft member; and a moving magnet that uses a magnetic force thereof to bias the leaf valve toward the valve disc.

9 Claims, 5 Drawing Sheets

DAMPING VALVE FOR SHOCK ABSORBER

TECHNICAL FIELD

This invention relates to a damping valve for a shock absorber.

BACKGROUND ART

In an example of a known conventional damping valve for a shock absorber, an annular leaf valve is laminated onto an outlet end of a port provided in a piston portion of the shock absorber so that the port is opened and closed by the leaf valve.

In particular, with a damping valve in which an inner peripheral side of the leaf valve is supported fixedly and the port is opened and closed by causing an outer peripheral side to bend, a damping force generated when a piston speed is in a medium/high speed region may become excessive, thereby impairing passenger comfort in a vehicle. To solve this problem, JP09-291961A discloses a damping valve for a hydraulic shock absorber in which the inner peripheral side of the leaf valve is not supported fixedly, and instead, the inner periphery of the leaf valve is caused to slide against an outer periphery of a piston nut and a back surface of the leaf valve is biased by a coil spring via a main valve.

In the hydraulic shock absorber described in JP09-291961A, the leaf valve does not open when the piston speed is in a low speed region, and damping force is generated only by an orifice punched into a valve seat. As a result, a substantially similar damping characteristic to that of a damping valve having a fixedly supported inner peripheral side is exhibited. When the piston speed reaches a high speed region, on the other hand, the leaf valve bends so as to open and is lifted together with the main valve so as to retreat from the piston against a biasing force of the coil spring. As a result, a flow passage surface area increases in comparison with that of a damping valve having a fixedly supported inner peripheral side, thereby preventing the damping force from becoming excessive. The passenger comfort of the vehicle can thus be improved.

SUMMARY OF THE INVENTION

In the damping valve described in JP09-291961A, however, the coil spring is required, and in order to secure a lift amount of the leaf valve, an overall length of a piston portion must be increased, making it difficult to secure a stroke length of the shock absorber.

This invention has been designed in consideration of the problems described above, and an object thereof is to provide a damping valve with which a stroke length of a shock absorber can be secured easily while improving the passenger comfort of a vehicle.

This invention is a damping valve for a shock absorber. The damping valve comprises a valve disc that delimits a cylinder interior filled with a working fluid, a port provided in the valve disc to connect fluid chambers delimited by the valve disc, an annular leaf valve that is laminated onto the valve disc and is capable of moving in an axial direction of the valve disc so as to open and close the port in accordance with a differential pressure between the fluid chambers, and a biasing mechanism that biases the leaf valve in a direction for closing the port, wherein the biasing mechanism comprises a shaft member constituted by a non-magnetic body, the leaf valve being disposed to be free to slide on an outer periphery of the shaft member; and a moving magnet that is disposed to be free to slide on the outer periphery of the shaft member and that uses a magnetic force thereof to bias the leaf valve toward the valve disc.

EMBODIMENTS OF THE INVENTION

Embodiments of this invention will be described below with reference to the figures.

First Embodiment

Figure 1:
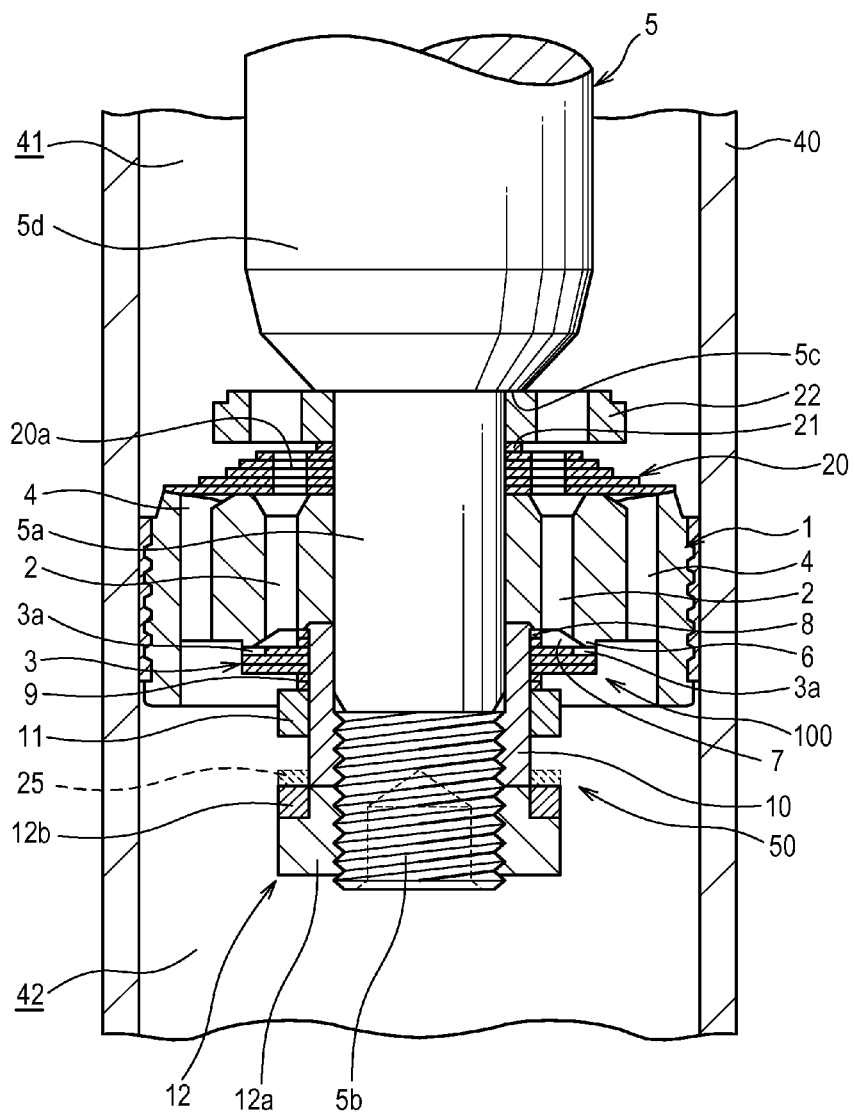
FIG. 1 is a longitudinal sectional view of a damping valve for a shock absorber according to a first embodiment of this invention.

Referring to FIG. 1, a damping valve 100 for a shock absorber according to a first embodiment of this invention will be described.

The damping valve 100 is interposed between a vehicle body and an axle of a vehicle in order to suppress vibration of the vehicle body, and provided on a piston of a shock absorber. In this embodiment, a case in which the damping valve 100 is an expansion side damping valve that generates expansion side damping force by applying resistance to working oil (a working fluid) when the shock absorber performs an expansion operation will be described.

The damping valve 100 includes a piston 1 serving as a valve disc that delimits an interior of a cylinder 40 filled with working oil, a port 2 provided in the piston 1, an annular leaf valve 3 that is laminated onto the piston 1 in order to open and close the port 2, and a biasing mechanism 50 that biases the leaf valve 3 in a direction for closing the port 2.

The piston 1 moves so as to slide freely through the cylinder 40. The interior of the cylinder 40 is delimited by the piston 1 into two pressure chambers, namely a rod side pressure chamber 41 and a piston side pressure chamber 42.

A plurality of ports 2 are provided to penetrate the piston 1, thereby connecting the rod side pressure chamber 41 to the piston side pressure chamber 42.

The leaf valve 3 opens and closes the ports 2 in accordance with a differential pressure between the rod side pressure chamber 41 and the piston side pressure chamber 42. More specifically, when a pressure in the rod side pressure chamber 41 rises to a point where the differential pressure between the rod side pressure chamber 41 and the piston side pressure chamber 42 reaches a predetermined value during the expansion operation of the shock absorber, an outer peripheral side of the leaf valve 3 bends such that downstream side opening portions of the respective ports 2 open. When the ports 2 open, working oil in the rod side pressure chamber 41 flows into the piston side pressure chamber 42 through the ports 2. The leaf valve 3 generates a predetermined pressure loss by applying resistance to the working oil passing through the ports 2. As a result, the shock absorber generates a predetermined expansion side damping force.

The shock absorber to which the damping valve 100 is applied includes the cylinder 40 filled with working oil, a cylinder head that seals an opening portion of the cylinder 40, a piston rod 5 serving as an assembly rod that penetrates the cylinder head to be free to slide and extends to the exterior of the cylinder 40, the piston 1, which is provided on an end portion of the piston rod 5 so as to slide freely within the cylinder 40, and a reservoir chamber that compensates for volumetric variation in the cylinder 40 occurring when the piston rod 5 infiltrates the cylinder 40 or withdraws from the cylinder 40. The reservoir chamber is partially filled with a gas.

The piston 1 is formed in a substantially tubular shape, and a small diameter portion 5a formed on a tip end side of the piston rod 5 is inserted into a hollow portion thereof. An outer periphery of the piston 1 slides against an inner periphery of the cylinder 40.

An annular valve seat 6 contacted by an outer peripheral side of the leaf valve 3 is formed as a projection on an end surface of the piston 1 on the piston side pressure chamber 42 side. The downstream side opening portions of the respective ports 2 communicate with an annular window 7 formed in the piston 1 on an inner peripheral side of the valve seat 6.

A plurality of contraction side ports 4 that allow the working oil to flow from the piston side pressure chamber 42 into the rod side pressure chamber 41 during a contraction operation of the shock absorber are formed in the piston 1 on an outer peripheral side of the valve seat 6.

The piston rod 5 includes the small diameter portion 5a and a large diameter portion 5b having a larger outer diameter than the small diameter portion 5a. A screw portion 5b is formed on an outer periphery of a part of the small diameter portion 5a inserted into the piston 1. A step portion 5c is formed on a boundary between the small diameter portion 5a and the large diameter portion 5b.

A contraction side annular leaf valve 20, an annular spacer 21, and a valve stopper 22 are laminated in that order onto an end surface of the piston 1 on the rod side pressure chamber 41 side. Further, a tubular shaft member 10 penetrated by the small diameter portion 5a is disposed in contact with an inner peripheral edge of the piston 1 on the piston side pressure chamber 42 side. The shaft member 10 is formed from a non-magnetic body. An annular spacer 8, the annular leaf valve 3, an annular spacer 9, and an annular moving magnet 11 are laminated in that order onto an outer periphery of the shaft member 10 to be free to slide. A magnetism generating member 12 having a larger outer diameter than the shaft member 10 is screwed to the screw portion 5b of the small diameter portion 5a. An end portion of the magnetism generating member 12 contacts an end portion of the shaft member 10 such that the shaft member 10 is pressed against the piston 1 by an axial force generated by the magnetism generating member 12. As a result, the shaft member 10, the piston 1, the leaf valve 20, the spacer 21, and the valve stopper 22 are sandwiched between the magnetism generating member 12 and the step portion 5c of the piston rod 5 and fixed to the piston rod 5.

An axial direction length (an up-down direction length in FIG. 1) of the shaft member 10 is set to be greater than an overall axial direction length of the laminated spacers 8, 9, leaf valve 3, and moving magnet 11. Accordingly, the spacers 8, 9, leaf valve 3, and moving magnet 11 are capable of moving in the axial direction along the outer periphery of the shaft member 10. In other words, the leaf valve 3 is disposed to be capable of moving in the axial direction of the piston 1.

The moving magnet 11 is laminated to a counter-piston side of the leaf valve 3 via the spacer 9. The magnetism generating member 12 generates a repulsive force that repels the moving magnet 11 by generating magnetism relative to a counter-piston side end surface of the moving magnet 11. The magnetism generating member 12 includes a nut portion 12a serving as a fixing member that is screwed to the screw portion 5b of the piston rod 5 so as to apply an axial force to the shaft member 10, and a fixed magnet 12b that is fixed to an outer periphery of the nut portion 12a so as to face the moving magnet 11 via a predetermined gap, and generates the repulsive force that repels the moving magnet 11. The fixed magnet 12b is therefore disposed to be incapable of moving relative to the shaft member 10. The moving magnet 11 and the fixed magnet 12b are formed from hard magnetic bodies and disposed such that opposing end surfaces thereof have identical polarities, thereby ensuring mutual repulsion. More specifically, respective N poles or S poles of the moving magnet 11 and the fixed magnet 12 are disposed to face each other.

The magnetism generating member 12 may be formed entirely from a magnet. In this case, the magnetism generating member 12 functions as the fixing member for fixing the piston 1 and the shaft member 10 to the small diameter portion 5a of the piston rod 5, and as the fixed magnet that generates the repulsive force that repels the moving magnet 11. However, a magnet is fragile, and therefore more preferably, the nut portion 12a that is screwed to the screw portion 5b and generates axial force is formed from a non-magnetic body and the fixed magnet 12 is disposed on the outer periphery of the nut portion 12a. In so doing, the fixed magnet 12 can be protected. Further, the fixed magnet 12 is not limited to a single annular magnet and may be constituted by a plurality of magnets. Moreover, the fixed magnet 12 may be buried in the nut portion 12a.

The leaf valve 3 closes the ports 2 when seated on the valve seat 6 and opens the ports 2 when separated from the valve seat 6. The leaf valve 3 is constructed by laminating a plurality of annular plates, and a bending rigidity thereof is adjusted in accordance with the number of laminated annular plates. The number of laminated annular plates is set as desired in accordance with a required damping characteristic of the shock absorber (a characteristic of the generated damping force relative to a piston speed of the shock absorber). A cutout 3a that connects the ports 2 to the piston side pressure chamber 42 is formed in an outer peripheral edge of an annular plate that is seated on the valve seat 6, from among the plurality of annular plates. The cutout 3a forms an orifice when the leaf valve 3 is seated on the valve seat 6. Instead of forming the cutout 3a in the annular plate, a recessed portion formed in the valve seat 6 by punching may be provided, and the orifice may be formed by the recessed portion.

When no load is exerted on the leaf valve 3 from an upstream side of the ports 2, the leaf valve 3 is pressed against the piston 1 together with the spacers 8, 9 by the repulsive force generated by the moving magnet 11 relative to the fixed magnet 12b, and as a result, the outer peripheral side thereof is seated on the valve seat 6 so as to close the ports 2. Before the differential pressure between the rod side pressure chamber 41 upstream of the ports 2 and the piston side pressure chamber 42 downstream of the ports 2 exceeds a predetermined value, the spacers 8, 9 and the leaf valve 3 are pressed against the piston 1 by the repulsive force between the moving magnet 11 and the fixed magnet 12b. In this condition, only the outer peripheral side of the leaf valve 3 is permitted to bend using the spacer 9, which has a smaller outer diameter than the leaf valve 3, as a bending fulcrum.

When the differential pressure between the rod side pressure chamber 41 upstream of the ports 2 and the piston side pressure chamber 42 downstream of the ports 2 exceeds the predetermined value, on the other hand, a force generated by the differential pressure between the rod side pressure chamber 41 and the piston side pressure chamber 42 in a direction for distancing the leaf valve 3 from the piston 1 exceeds the repulsive force between the moving magnet 11 and the fixed magnet 12b. As a result, the leaf valve 3 moves away from the piston 1 together with the moving magnet 11 in a departing direction from the piston 1. When the leaf valve 3 has moved by a predetermined amount, the moving magnet 11 contacts the fixed magnet 12b, whereby further movement of the leaf valve 3 is restricted. Hence, the fixed magnet 12b of the magnetism generating member 12 also functions as a stopper that limits movement of the moving magnet 11 to a predetermined amount.

The repulsive force generated between the moving magnet 11 and the fixed magnet 12b increases as the moving magnet 11 approaches the fixed magnet 12b. Therefore, when the moving magnet 11 contacts the fixed magnet 12b, a movement speed of the moving magnet 11 slows, thereby alleviating an impact generated upon contact between the moving magnet 11 and the fixed magnet 12b.

The shaft member 10 disposed on an inner side of the moving magnet 11 is a non-magnetic body, and therefore the shaft member 10 does not constrain the movement of the moving magnet 11. Hence, smooth axial direction movement of the leaf valve 3 is not impaired by the shaft member 10.

A surface on which the spacer 8 is disposed and a bottom surface of the annular window 7 are formed to be flush on the end surface of the piston 1 on the piston side pressure chamber 42 side. The valve seat 6 is formed to be higher than this surface, and therefore a step is formed between the valve seat 6 and the surface. Hence, when the outer peripheral side of the leaf valve 3 bends in a condition where the leaf valve 3 is sandwiched between the piston 1 and the moving magnet 11 by the repulsive force generated between the moving magnet 11 and the fixed magnet 12b, the leaf valve 3 is seated on the valve seat 6. A bending amount may be adjusted by varying an axial direction length of the spacer 8. More specifically, the bending amount can be adjusted by modifying a number and a thickness of annular plates forming the spacer 8. In a case where the bending amount of the leaf valve 3 is determined by the height of the valve seat 6 alone, the spacer 8 may be omitted.

In the first embodiment, the biasing mechanism 50 includes the shaft member 10, the moving magnet 11, and the magnetism generating member 12, and uses the repulsive force by which the moving magnet 11 and the fixed magnet 12b of the magnetism generating member 12 are repelled from each other as a biasing force. Hence, the moving magnet 11 biases the leaf valve 3 toward the piston 1 using a magnetic force thereof.

When the piston 1 is formed from a magnetic body, the moving magnet 11 can be caused to bias the leaf valve 3 toward the piston 1 using a force with which the piston 1 attracts the moving magnet 11 in addition to the repulsive force between the moving magnet 11 and the fixed magnet 12b. Accordingly, magnets that generate weak magnetic force can be used as the moving magnet 11 and the fixed magnet 12b. When the spacers 8, 9 and the leaf valve 3 are also formed from magnetic bodies in this case, magnetic flux from the moving magnet 11 passes through the spacers 8, 9 and the leaf valve 3, leading to a reduction in magnetoresistance, and as a result, a reduction in the force with which the piston 1 attracts the moving magnet 11 can be suppressed.

Here, a magnetic body includes a hard magnetic body and a soft magnetic body. A hard magnetic body is a magnetic body such as a permanent magnet that is not easily magnetized when an external magnetic field is applied but exhibits strong force for holding residual magnetization. A soft magnetic body is a magnetic body which is magnetized easily in alignment with a magnetic field direction by an external magnetic field but exhibits little force for holding residual magnetization. Further, a non-magnetic body is a body that does not interact with a magnetic field.

In a case where the piston 1 is formed from a magnetic body, a cost increase occurs when the piston 1 is formed from a hard magnetic body, and therefore the piston 1 is preferably formed from a soft magnetic body.

The contraction side leaf valve 20 is a so-called outward-opening leaf valve that is laminated onto the end surface of the piston 1 on the rod side pressure chamber 41 side such that an inner peripheral side thereof serves as a fixed end and an outer peripheral side thereof serves as a free end. When the pressure in the piston side pressure chamber 42 is small such that the leaf valve 20 cannot bend, the leaf valve 20 closes the ports 4. When, on the other hand, the outer peripheral side of the leaf valve 20 is bended by an action of the pressure in the piston side pressure chamber 42, which is received via the ports 4 during the contraction operation of the shock absorber, the leaf valve 20 opens the ports 4. At this time, the leaf valve 20 generates a predetermined pressure loss by applying resistance to the working oil that flows through the ports 4 from the piston side pressure chamber 42 into the rod side pressure chamber 41. As a result, the shock absorber generates a predetermined contraction side damping force. Through holes 20a are formed in the leaf valve 20 to prevent the leaf valve 20 from closing inlets the ports 2, and therefore the working oil flow from the rod side pressure chamber 41 into the ports 2 is not impaired.

Actions of the damping valve 100 will now be described.

When the shock absorber performs an expansion operation such that the piston 1 moves through the cylinder 40 upward in FIG. 1, the pressure in the rod side pressure chamber 41 increases, and as a result, the working oil in the rod side pressure chamber 41 attempts to move into the piston side pressure chamber 42 through the ports 2.

Figure 2:
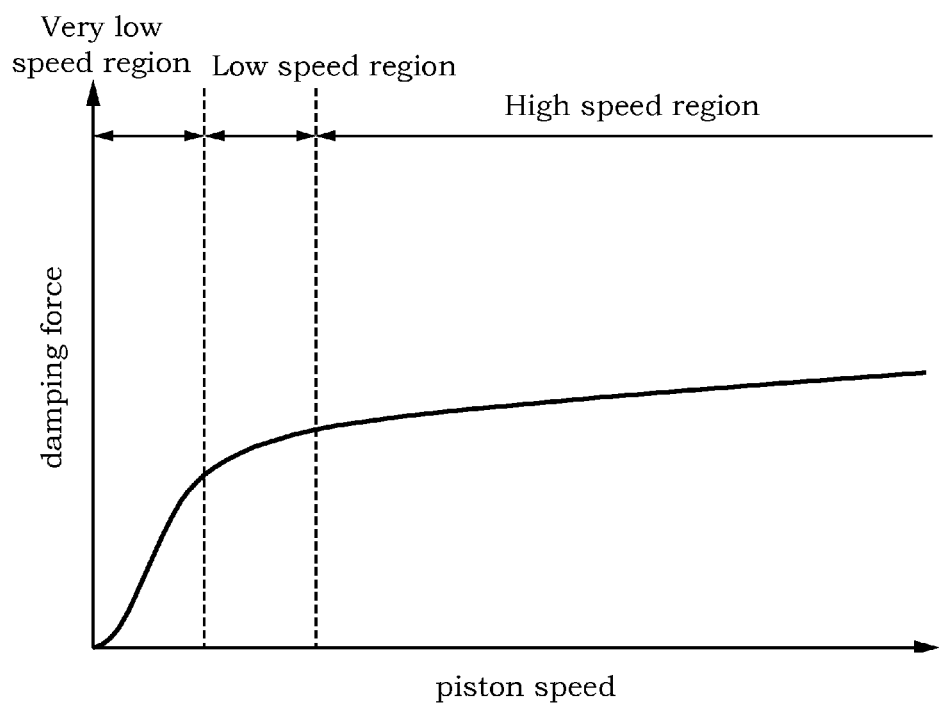
FIG. 2 is a view showing a damping characteristic of the shock absorber according to the first embodiment of this invention.

When the piston speed, i.e. an expansion/contraction speed of the shock absorber, is in a very low speed region, the differential pressure between the rod side pressure chamber 41 and the piston side pressure chamber 42 does not reach a valve opening pressure at which the outer peripheral side of the leaf valve 3 bends so as to separate from the valve seat 6. Further, the moving magnet 11 presses the leaf valve 3 against the piston 1 using the repulsive force generated relative to the fixed magnet 12b of the magnetism generating member 12. Hence, in this condition, the leaf valve 3 remains seated on the valve seat 6 such that the ports 2 remain closed, and as a result, the working oil flows only through the orifice constituted by the cutout 3a. As shown in FIG. 2, the damping characteristic of the shock absorber at this time exhibits a comparatively large damping coefficient.

When the piston speed reaches a low speed region, the differential pressure between the rod side pressure chamber 41 and the piston side pressure chamber 42 reaches the valve opening pressure of the leaf valve 3. However, the repulsive force between the moving magnet 11 and the fixed magnet 12b remains larger than the pressing force generated by the differential pressure between the rod side pressure chamber 41 and the piston side pressure chamber 42 in the direction for distancing the leaf valve 3 from the piston 1, and therefore the leaf valve 3 does not move away from the piston 1. In this condition, the outer peripheral side of the leaf valve 3 bends so as to separate from the valve seat 6, and as a result, the working oil passes through a gap formed between the leaf valve 3 and the valve seat 6. As shown in FIG. 2, the damping characteristic of the shock absorber at this time exhibits an increased damping force in proportion to the increase in the piston speed, but the damping coefficient is smaller than that of the very low speed region. In other words, a gradient of the damping characteristic is small.

When the piston speed reaches a high speed region, the pressing force generated by the differential pressure between the rod side pressure chamber 41 and the piston side pressure chamber 42 in the direction for distancing the leaf valve 3 from the piston 1 exceeds the repulsive force between the moving magnet 11 and the fixed magnet 12b, and therefore the leaf valve 3 slides along the outer periphery of the shaft member 10 together with the spacer 9 and the moving magnet 11 so as to separate from the piston 1, and moves in the axial direction until the pressing force and the repulsive force are counterbalanced. When the moving magnet 11 and the fixed magnet 12b come into contact, further movement of the leaf valve 3 is restricted.

In a case where the piston 1 is formed from a magnetic body, the attractive force with which the piston 1 attracts the moving magnet 11 is also applied, and therefore the leaf valve 3 moves when the pressing force exceeds a total force of the repulsive force and the attractive force. In this case, the attractive force with which the piston 1 attracts the moving magnet 11 can also be used as the biasing force for biasing the leaf valve 3 toward the piston 1, and therefore the differential pressure between the rod side pressure chamber 41 and the piston side pressure chamber 42 at which the leaf valve 3 begins to move can be increased. Further, when the piston 1 is formed from a magnetic body, the attractive force can be used, and therefore, in comparison with a case where the piston 1 is formed from a non-magnetic body, magnets exhibiting weaker magnetic force can be used as the moving magnet 11 and the fixed magnet 12b. As a result, a reduction in manufacturing cost can be achieved.

As shown in FIG. 2, the damping characteristic of the shock absorber when the piston speed is in the high speed region exhibits an increased damping force in proportion with the piston speed, but the damping coefficient is smaller than that of the low speed region. In other words, the gradient of the damping characteristic is small.

When an expansion/contraction direction of the shock absorber reverses, or in other words when the shock absorber switches from the expansion operation to the contraction operation, the leaf valve 3 is moved in a direction approaching the piston 1 by the pressure in the piston side pressure chamber 42 and the repulsive force between the moving magnet 11 and the fixed magnet 12b, and as a result, the leaf valve 3 is seated on the valve seat 6. At this time, the repulsive force is generated by the moving magnet 11 and the fixed magnet 12b, and therefore movement of the moving magnet 11 is not impaired. Accordingly, the leaf valve 3 is seated on the valve seat 6 quickly. Hence, closing of the ports 2 is not delayed when the shock absorber switches from the expansion operation to the contraction operation, and therefore a response delay in generation of the contraction side damping force does not occur.

According to this embodiment, following actions and effects are obtained.

The damping valve 100 includes the moving magnet 11 disposed to be free to slide on the outer periphery of the shaft member 10 and the fixed magnet 12b that generates the repulsive force that repels the moving magnet 11, and the moving magnet 11 uses the repulsive force to bias the leaf valve 3 toward the piston 1. The gradient of the damping characteristic of the shock absorber when the piston speed is in the high speed region can therefore be reduced, and as a result, an improvement in the passenger comfort of the vehicle can be achieved.

Further, in the damping valve 100, only a total length of the movement amount of the leaf valve 3 from the piston 1 and the axial direction length of the moving magnet 11 is required. In a conventional damping valve incorporating a coil spring and a main valve, on the other hand, a total length of a maximum contraction length in which a wire of the coil spring is tightly compressed, the movement amount of the leaf valve, and an axial direction length of the main valve is required. With the damping valve 100, therefore, the overall axial direction length of the damping valve 100 can be reduced in comparison with a conventional damping valve incorporating a coil spring and a main valve. As a result, a stroke length, i.e. a range in which the shock absorber can expand and contract, can be secured. Further, the shock absorber can be installed favorably in the vehicle.

Figure 3:
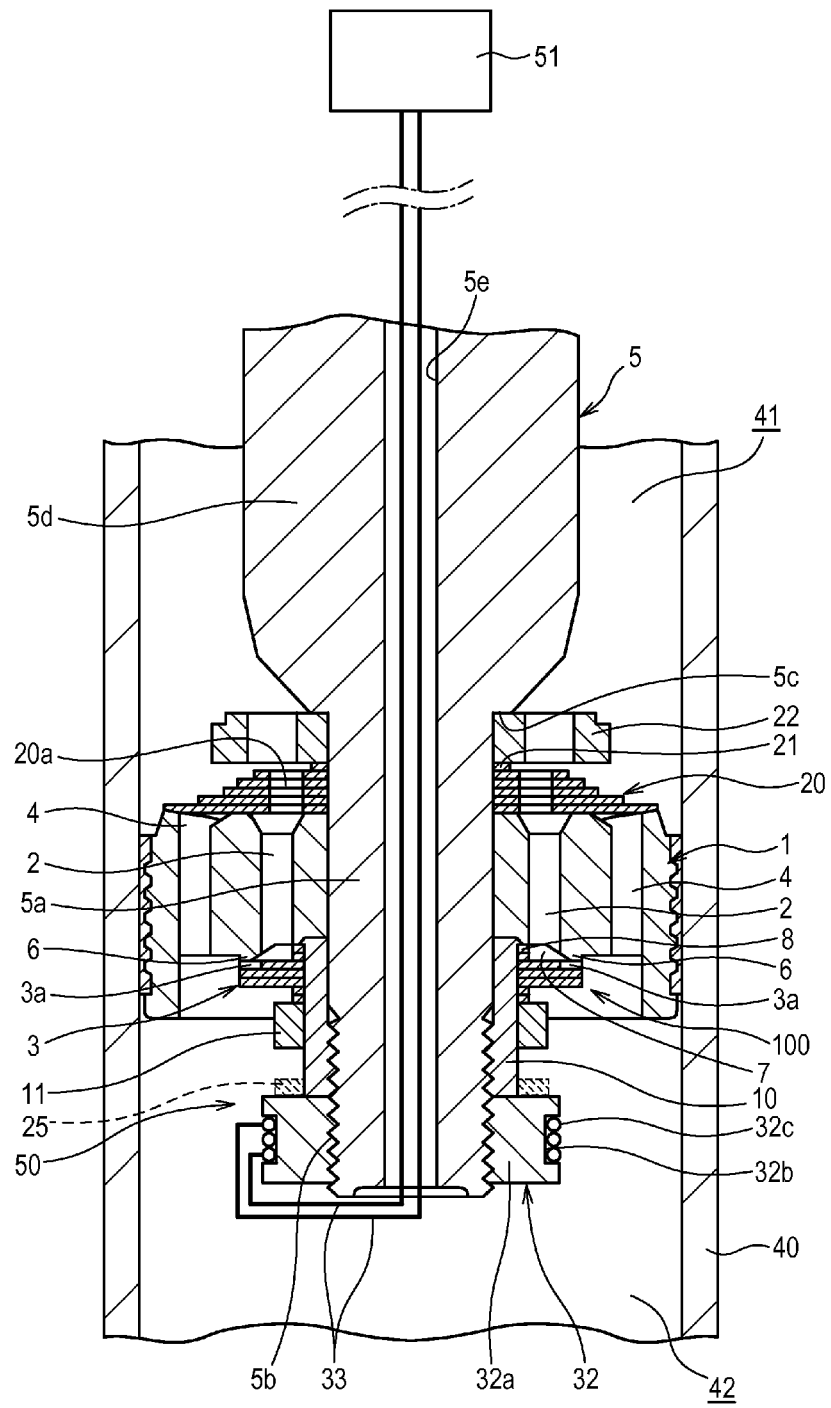
FIG. 3 is a modified example of the damping valve for the shock absorber according to the first embodiment of this invention.

Next, referring to FIG. 3, a modified example of the first embodiment will be described.

The magnetism generating member described above may be constituted by an electromagnet 32. The electromagnet 32 includes a nut portion 32a screwed to the screw portion 5b of the piston rod 5, and a winding 32c wound in an annular recessed portion 32b formed in an outer periphery of the nut portion 32a. The nut portion 32a fixes the shaft member 10, the piston 1, the leaf valve 20, the spacer 21, and the valve stopper 22 to the piston rod 5 using an axial force thereof. A through hole 5e is formed to penetrate the piston rod 5 in the axial direction. The winding 32c is connected to a power supply device 51 disposed on the exterior of the shock absorber by a lead wire 33 inserted into the through hole 5e.

When the winding 32c is energized by the power supply device 51, the electromagnet 32 generates magnetic force, and as a result, repulsive force is generated between the electromagnet 32 and the moving magnet 11. The moving magnet 11 biases the leaf valve 3 toward the piston 1 using the repulsive force.

Hence, when the electromagnet 32 is used, the moving magnet 11 biases the leaf valve 3 toward the piston 1 using the repulsive force generated relative to the electromagnet 32, similarly to the case in which the fixed magnet 12b is used, and therefore the gradient of the damping characteristic of the shock absorber when the piston speed is in the high speed region can be reduced. As a result, the passenger comfort of the vehicle can be improved.

Further, when the electromagnet 32 is used, the overall axial direction length of the damping valve 100 can be shortened in comparison with a conventional damping valve, similarly to the case in which the fixed magnet 12b is used, and therefore the stroke length, i.e. the range in which the shock absorber can expand and contract, can be secured. Further, the shock absorber can be installed favorably in the vehicle.

When the electromagnet 32 is used, the repulsive force between the moving magnet 11 and the electromagnet 32 is adjusted by controlling a current supplied to the winding 32c from the power supply device 51. Hence, the biasing force with which the moving magnet 11 biases the leaf valve 3 can be adjusted, and therefore the damping characteristic can be adjusted easily. Further, when the piston 1 is formed from a magnetic body, the attractive force with which the piston 1 attracts the moving magnet 11 can also be used as the biasing force for biasing the leaf valve 3 toward the piston 1. Therefore, a larger biasing force can be applied to the leaf valve 3, enabling an increase in a biasing force adjustment width.

Another configuration of the power supply device 51 will now be described. The power supply device 51 includes a power source, a switch interposed between the power source and the winding 32c, a current detector that detects a value of the current flowing through the winding 32c, and a control unit that controls opening and closing of the switch. The shock absorber is provided with a stroke speed detector that detects a stroke speed of the shock absorber, and a control device that controls the damping force generated by the shock absorber. The control device calculates a damping force to be generated by the shock absorber, calculates the current value to be applied to the winding 32c from the damping force calculation result and the stroke speed, and controls opening and closing of the switch while feeding back the current value actually flowing to the winding 32c. The control unit and the control device may be integrated.

As shown by dotted lines in FIG. 1, an annular cushion 25 that alleviates the impact generated when the moving magnet 11 contacts the fixed magnet 12b may be provided on either the moving magnet 11 or the fixed magnet 12b. In so doing, the moving magnet 11 can be protected from the impact generated upon contact, and impact noise generation upon contact can be prevented. The cushion 25 is formed from an elastic material. The cushion 25 may be provided similarly on either the moving magnet 11 or the electromagnet 32, as shown by dotted lines in FIG. 3.

In the above embodiment, a case in which the damping valve 100 is incorporated into the piston rod 5 was described. Instead, however, the damping valve 100 may be applied to a base valve disposed in a bottom portion of a double cylinder shock absorber to generate contraction side damping force. In this case, a valve disc that defines the piston side pressure chamber 42 and the volume compensating reservoir chamber and is formed with ports, a leaf valve, a shaft member, the moving magnet, and the magnetism generating member 12 are incorporated into a center rod serving as an attachment rod. Similarly with this configuration, the overall axial direction length of the damping valve 100 can be shortened in comparison with a conventional damping valve.

In the above embodiment, the valve seat 6 is described as having an annular shape. Instead, however, a petal valve-shaped valve seat that surrounds the respective outlet ends of the plurality of ports 2 may be used. Further, the ports 2 and the ports 4 may be provided at an incline relative to the axial direction of the piston 1. This configuration may be employed similarly when the damping valve 100 is applied to a base valve.

In the above embodiment, the piston speed was divided into the very low speed region, the low speed region, and the high speed region in order to describe variation in the damping characteristic. However, boundary speeds between the divisions may be set as desired. The respective magnetic forces of the moving magnet 11 and the magnetism generating member 12 may be set in accordance with the division settings. More specifically, when the division between the low speed region and the high speed region is to be shifted to a higher piston speed, the magnetic force of at least one of the moving magnet 11 and the magnetism generating member 12 should be increased accordingly. Further, when the division is to be shifted to a lower piston speed, the magnetic force of at least one of the moving magnet 11 and the magnetism generating member 12 should be reduced accordingly.

Furthermore, when the nut portions 12a, 32a are formed from non-magnetic bodies, the nut portions 12a, 32a may be integrated with the shaft member 10 to form a single member, and in so doing, a number of components can be reduced.

Moreover, in the above embodiment, a case in which the damping valve 100 functions as an expansion side damping valve was described. However, the damping valve 100 may be configured to function as a contraction side damping valve. The damping valve 100 may also be configured to function as both an expansion side and a contraction side damping valve.

Second Embodiment

Next, referring to FIG. 4, a damping valve 200 for a shock absorber according to a second embodiment of this invention will be described.

The following description focuses on points that differ from the first embodiment. Accordingly, identical configurations to the damping valve 100 of the first embodiment have been allocated identical reference symbols, and description thereof has been omitted.

The damping valve 200 differs from the damping valve 100 according to the first embodiment in that the piston 1 is formed from a magnetic body. Further, the damping valve 200 is not provided with the magnetism generating member 12, and a piston nut 60 serving as a fixing member formed from a non-magnetic body is screwed to the screw portion 5b on the small diameter portion 5a of the piston rod 5.

In the second embodiment, the biasing mechanism 50 includes the shaft member 10, the moving magnet 11, and the magnetic body piston 1, and uses the attractive force with which the piston 1 attracts the moving magnet 11 as the biasing force. Hence, the moving magnet 11 biases the leaf valve 3 toward the piston 1 using the magnetic force thereof.

In the first embodiment, the moving magnet 11 biases the leaf valve 3 toward the piston 1 using the repulsive force generated between the moving magnet 11 and the fixed magnet 12b, whereas in the second embodiment, the moving magnet 11 biases the leaf valve 3 toward the piston 1 using the attractive force with which the piston 1 attracts the moving magnet 11.

When the force generated by the differential pressure between the rod side pressure chamber 41 and the piston side pressure chamber 42 in the direction for distancing the leaf valve 3 from the piston 1 exceeds the attractive force with which the piston 1 attracts the moving magnet 11, the leaf valve 3 slides along the outer periphery of the shaft member 10 together with the moving magnet 11 so as to move in the axial direction away from the piston 1.

An end portion of the piston nut 60 contacts the end portion of the shaft member 10 such that the shaft member 10 is pressed against the piston 1 by an axial force generated by the piston nut 60. As a result, the shaft member 10, the piston 1, the leaf valve 20, the spacer 21, and the valve stopper 22 are sandwiched between the piston nut 60 and the step portion 5c of the piston rod 5 and fixed to the piston rod 5.

An outer diameter of the piston nut 60 is larger than an outer diameter of the shaft member 10. The piston nut 60 therefore functions as a stopper that limits movement of the moving magnet 11 to a predetermined amount. The piston nut 60 is a non-magnetic body, and therefore, even when the moving magnet 11 contacts the piston nut 60, the moving magnet 11 is not adsorbed to the piston nut 60. The shaft member 10 disposed on the inner side of the moving magnet 11 is also a non-magnetic body, and therefore the shaft member 10 does not constrain the movement of the moving magnet 11. Hence, smooth axial direction movement of the leaf valve 3 is not impaired by the piston nut 60 and the shaft member 10.

All or a part of the piston 1 may be formed from a hard magnetic body. In this case, the piston 1 and the moving magnet 11 are preferably disposed such that opposing end surfaces thereof have different polarities, thereby ensuring mutual attraction. However, a cost increase is incurred by forming the piston 1 from a hard magnetic body, and therefore the piston 1 is preferably formed from a soft magnetic body.

Figure 5:
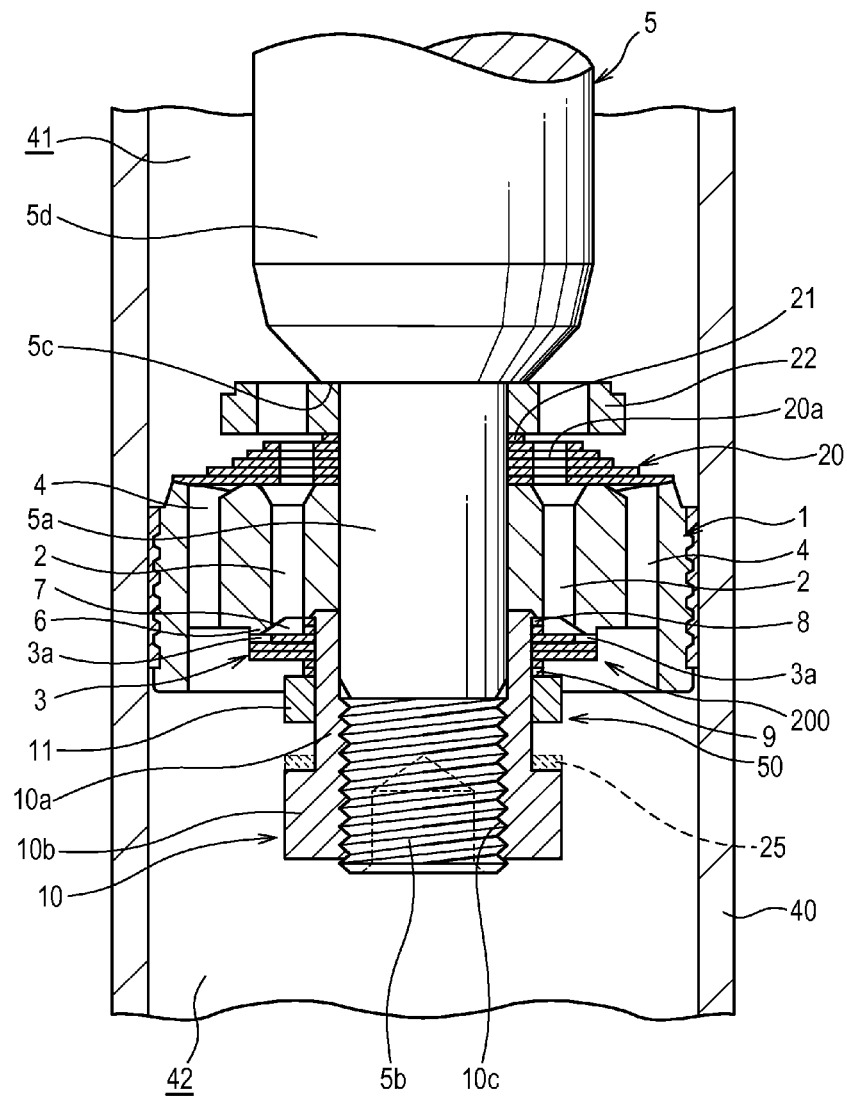
FIG. 5 is a modified example of the damping valve for the shock absorber according to the second embodiment of this invention.

Referring to FIG. 5, a modified example of the second embodiment will be described. In this modified example, the shaft member 10 and the piston nut 60 are formed integrally. More specifically, the shaft member 10 is a substantially tubular member including a main body portion 10a against whose outer periphery the leaf valve 3 and the moving magnet 11 slide, and a stopper 10b that is formed with a larger diameter than the main body portion 10a so as to limit movement of the moving magnet 11 to a predetermined amount. A female screw portion 10c that is screwed to the screw portion 5b on the small diameter portion 5a of the piston rod 5 is formed on an inner peripheral surface of the shaft member 10. The shaft member 10 functions as a fixing member that fixes respective members to the piston rod 5, and a stopper that limits movement of the moving magnet 11 to a predetermined amount.

Figure 4:
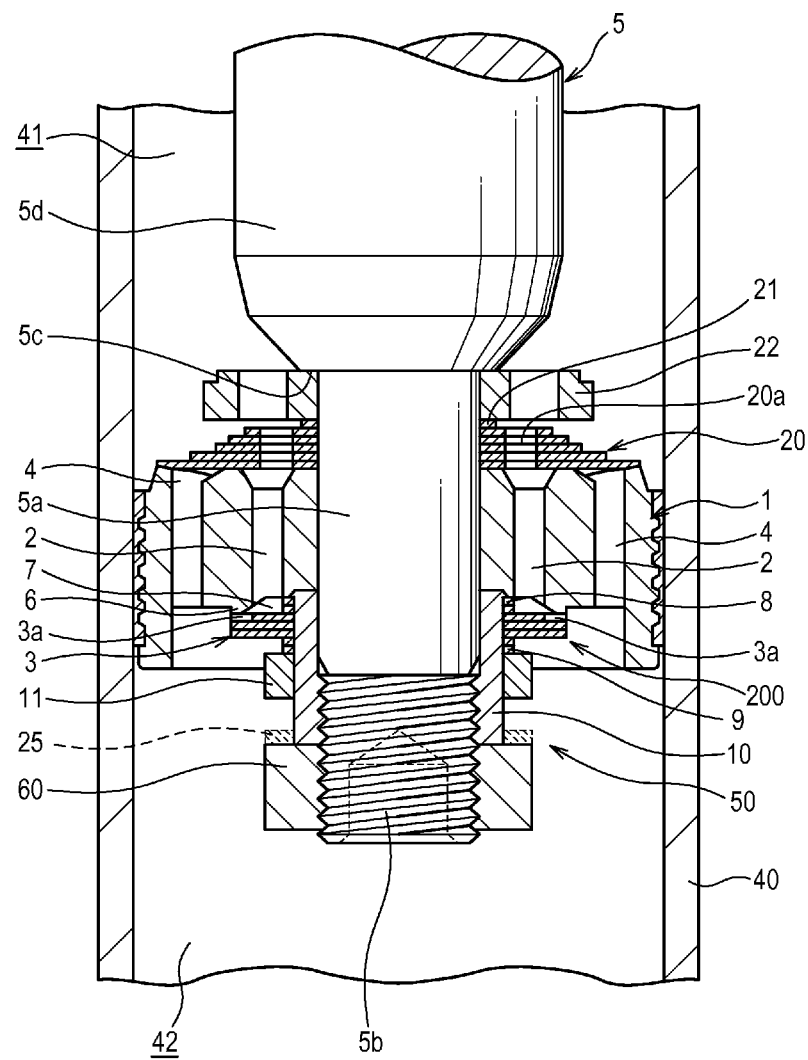
FIG. 4 is a longitudinal sectional view of a damping valve for a shock absorber according to a second embodiment of this invention.

As shown by dotted lines in FIG. 4, the annular cushion 25 that alleviates an impact generated when the moving magnet 11 contacts the piston nut 60 may be provided on either the moving magnet 11 or the piston nut 60. In so doing, the moving magnet 11 can be protected from the impact generated upon contact, and impact noise generation upon contact can be prevented. The cushion 25 is formed from an elastic material. The cushion 25 may be provided similarly on either the moving magnet 11 or the stopper 10b, as shown by dotted lines in FIG. 5.

Actions and effects of the damping valve 200 are similar to the actions and effects of the damping valve 100 described in the first embodiment.

This invention is not limited to the embodiment described above, and may be subjected to various modifications within the scope of the technical spirit thereof.

With respect to the above description, the contents of applications No. 2010-168784 and No. 2010-168785, with a filing date of Jul. 28, 2010 in Japan, are incorporated herein by reference.

The invention claimed is:

1. A damping valve for a shock absorber, comprising:
   a valve disc that delimits a cylinder interior filled with a working fluid;
   a port provided in the valve disc to connect fluid chambers delimited by the valve disc;
   an annular leaf valve that is laminated onto the valve disc and is capable of moving in an axial direction of the valve disc so as to open and close the port in accordance with a differential pressure between the fluid chambers; and
   a biasing mechanism that biases the leaf valve in a direction for closing the port,
   wherein the biasing mechanism comprises:
   a shaft member constituted by a non-magnetic body, the leaf valve being disposed to be free to slide on an outer periphery of the shaft member;
   a moving magnet that is disposed to be free to slide on the outer periphery of the shaft member; and
   a fixed magnet that is disposed fixedly opposite the moving magnet via a predetermined gap, and generates a repulsive force that repels the moving magnet,
   the moving magnet biases the leaf valve toward the valve disc using the repulsive force.

2. The damping valve for a shock absorber as defined in claim 1, wherein the valve disc is a magnetic body, and
   the moving magnet biases the leaf valve toward the valve disc using an attractive force which is generated by being attracted toward the valve disc in addition to the repulsive force.

3. The damping valve for a shock absorber as defined in claim 1, wherein the fixed magnet is an electromagnet.

4. The damping valve for a shock absorber as defined in claim 1, further comprising a cushion provided on one of the moving magnet and the fixed magnet to alleviate an impact generated when the moving magnet contacts the fixed magnet.

5. The damping valve for a shock absorber as defined in claim 1, further comprising:
   an assembly rod inserted into the valve disc and the shaft member; and
   a fixing member that is screwed to the assembly rod to fix the valve disc and the shaft member to the assembly rod,
   wherein the fixing member functions as the fixed magnet.

6. The damping valve for a shock absorber as defined in claim 1, further comprising:
   an assembly rod inserted into the valve disc and the shaft member; and
   a fixing member that is screwed to the assembly rod to fix the valve disc and the shaft member to the assembly rod,
   wherein the fixed magnet is fixed to the fixing member.

7. The damping valve for a shock absorber as defined in claim 1, wherein the fixed magnet, the moving magnet and the leaf valve are disposed in that stated order on a completely straight line.

8. The damping valve for a shock absorber as defined in claim 1, wherein the fixed magnet is disposed relative to the moving magnet so that as the moving magnet moves away from the valve disc in a movement, the repulsive force increases.

9. The damping valve for a shock absorber as defined in claim 8, wherein as a distance between the valve disc and the moving magnet increases, the movement of the moving magnet decreases in speed due to the repulsive force.

* * * * *